UNITED STATES PATENT OFFICE.

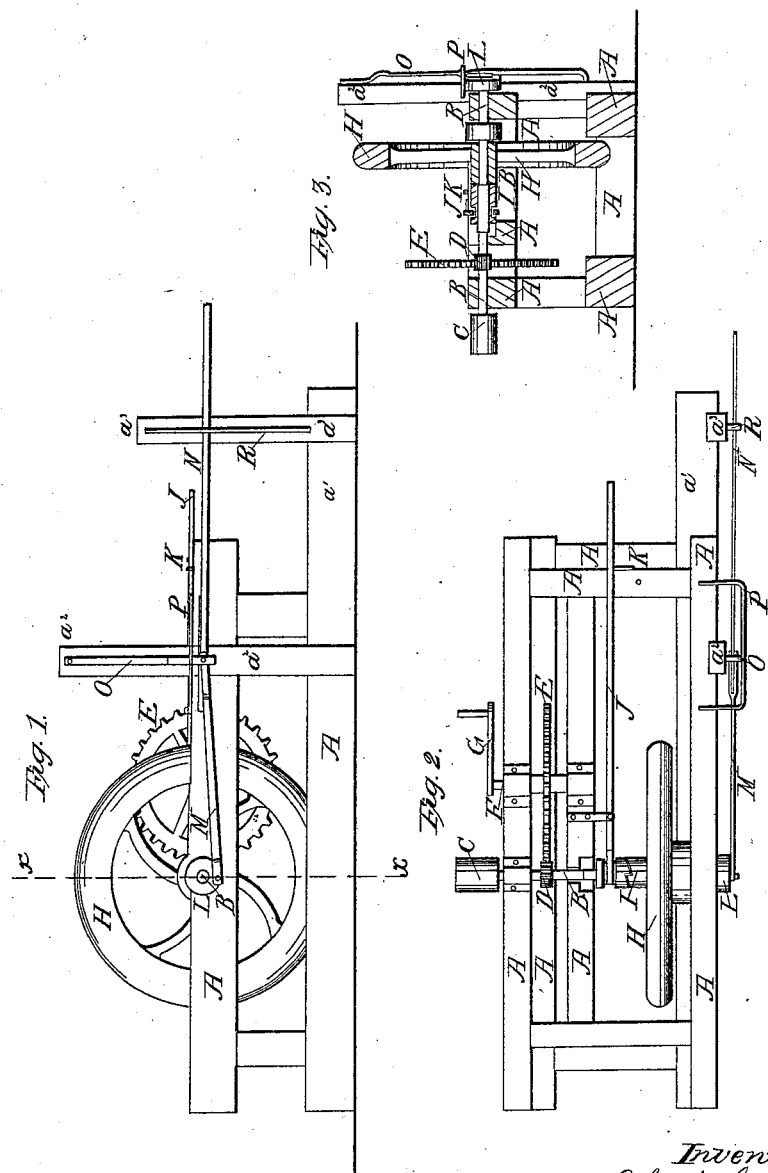

CHARLES W. SAPPENFIELD, OF CRAWFORDSVILLE, INDIANA.

IMPROVEMENT IN SAWING-MACHINES.

Specification forming part of Letters Patent No. 59,275, dated October 30, 1866.

*To all whom it may concern:*

Be it known that I, CHARLES W. SAPPENFIELD, of Crawfordsville, in the county of Montgomery and State of Indiana, have invented a new and Improved Sawing-Machine; and I do hereby declare that the following is a full, clear, and exact description thereof, which will enable others skilled in the art to make and use the same, reference being had to the accompanying drawings, forming part of this specification, in which—

Figure 1 is a side view of my improved machine. Fig. 2 is a top or plan view of the same. Fig. 3 is a vertical cross-section of the same, taken through the line $x\ x$, Fig. 1.

Similar letters of reference indicate like parts.

My invention has for its object to furnish an improved sawing-machine by means of which cord-wood or other wood or timber may be sawed rapidly, and which shall be so constructed as to economize power when the working part of the machine is stopped to adjust the saw or wood; and it consists in the arrangement of certain devices, as will be hereinafter more fully described.

A is the frame of the machine, the foundation-sill $a^1$ of which, on the side at which the saw is attached, is made from a foot and a half to two feet longer than the one on the other side, as shown in the drawings, according to the size of the machine.

B is the driving-shaft, which revolves in bearings in the frame A of the machine, as shown in the drawings. To the end of the shaft B is attached the driving-pulley C, around which passes the driving-belt when the machine is driven by steam or horse power. Upon the shaft B is also placed a pinion-wheel, D, into which mesh the teeth of the cog-wheel E.

The cog-wheel E is attached to a shaft, F, revolving in bearings on the frame A of the machine, and to the end of this shaft is attached the crank G, by means of which the machine may be started or driven when used as a hand-power.

H is the fly-wheel, which revolves freely upon the shaft B except when held by the clutch I, as hereinafter described.

The clutch I may be secured to shaft B by a screw passing through the said nut, and into a slot formed in the shaft B, so that while forced to revolve with the said shaft it may slide freely upon it; or it may be secured by making the part of the shaft B on which the said clutch works square, fitting into a square hole through the said clutch I. This latter method I prefer.

The end of the clutch I and the end of the hub of the fly-wheel H are made toothed, so that when the clutch is moved up into contact with the hub of the wheel the clutch may take hold of the wheel and cause it to revolve with the shaft B.

Around the clutch I is formed a groove, as shown in Figs. 2 and 3, in which rides the end of the lever J. This lever is pivoted to an arm attached to the frame A of the machine, as seen in Fig. 2, and its end extends forward over the end of the frame A, where it comes in contact with catches or stops K, which hold it in any required position.

L is the crank-wheel, which is attached to the end of the shaft B, as shown, and by which motion is communicated to the saw. To this crank-wheel L is connected one end of the pitman M, the other end of which is pivoted to the saw-pitman N, and also to the swinging pitman O.

The swinging pitman O is pivoted at its upper end to the support or post $a^2$, attached to the side of the frame A, and it is made to swing in line by the guide P, attached to the frame A, as shown in Fig. 2.

To the forward end of the pitman N is attached the saw, and said pitman is kept in line while vibrating by the guide R, attached to the support or post $a^3$, attached to the side of the projecting sill $a^1$ of the frame A.

One of the especial advantages of this machine is, that I am able to stop the operating parts of the machine while adjusting the wood to be sawed without stopping the fly-wheel, thus greatly economizing the expenditure of power, since the power necessary to overcome the inertia of the fly-wheel while in a state of rest is not necessary to be applied every time the wood is adjusted, and at the same time the danger of being injured by the saw while adjusting the wood is effectually guarded against.

Having thus described my invention, what I claim as new, and desire to secure by Letters Patent, is—

The operating device of a sawing-machine herein described, consisting of the clutch I, fly-wheel H, shaft B, lever J, crank-wheel L, pitmen M and N, swinging pitman O, and guides P and R, arranged and operating substantially as and for the purpose specified.

The above specification of my invention signed by me this 14th day of February, 1866.

CHARLES W. SAPPENFIELD.

Witnesses:
REUBEN E. McDANIEL,
EUSEBIUS M. SAPPENFIELD.